US008589075B1

(12) United States Patent
Jones

(10) Patent No.: US 8,589,075 B1
(45) Date of Patent: Nov. 19, 2013

(54) METHOD, SYSTEM, AND COMPUTER PROGRAM PRODUCT FOR VISUALIZING TRIP PROGRESS

(75) Inventor: Jonah Jones, Sydney (AU)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/277,028

(22) Filed: Oct. 19, 2011

(51) Int. Cl.
G06F 7/00 (2006.01)
G06F 19/00 (2011.01)

(52) U.S. Cl.
USPC ...... 701/527; 701/429; 701/32.5; 340/995.19

(58) Field of Classification Search
USPC ......... 701/409, 400, 442, 527, 428–429, 431, 701/533, 32.5, 411–412, 418, 423, 454; 340/990, 995.19; 348/116
See application file for complete search history.

(56) References Cited

U.S. PATENT DOCUMENTS

| | | | |
|---|---|---|---|
| 5,243,528 A * | 9/1993 | Lefebvre | 701/429 |
| 6,067,502 A | 5/2000 | Hayashida et al. | |
| 6,278,938 B1 * | 8/2001 | Alumbaugh | 701/438 |
| 6,812,888 B2 | 11/2004 | Drury et al. | |
| 6,973,318 B2 | 12/2005 | Jambhekar | |
| 7,206,837 B2 | 4/2007 | Seligmann | |
| 7,395,149 B2 | 7/2008 | Matsumoto et al. | |
| 7,444,237 B2 | 10/2008 | Dale | |
| 7,822,491 B2 | 10/2010 | Howlett | |
| 7,840,579 B2 | 11/2010 | Samuelson et al. | |
| 7,865,306 B2 * | 1/2011 | Mays | 701/437 |
| 7,937,394 B2 | 5/2011 | Venkataraman et al. | |
| 8,108,144 B2 * | 1/2012 | Forstall et al. | 701/426 |
| 8,175,802 B2 * | 5/2012 | Forstall et al. | 701/424 |
| 8,180,379 B2 * | 5/2012 | Forstall et al. | 455/456.6 |
| 8,190,362 B2 * | 5/2012 | Barker et al. | 701/414 |
| 8,204,684 B2 * | 6/2012 | Forstall et al. | 701/433 |
| 8,213,389 B2 * | 7/2012 | Bush et al. | 370/334 |
| 8,260,320 B2 * | 9/2012 | Herz | 455/456.3 |

(Continued)

FOREIGN PATENT DOCUMENTS

| | | |
|---|---|---|
| JP | 2005114695 A | 4/2005 |
| KR | 2010097238 A | 9/2010 |

(Continued)

OTHER PUBLICATIONS

Nautical and aeronautical electronic charting/navigation systems evelopments, similarities and differences; Theunissen, E.; De Groot, C.A.; Sabelis, H.; Koeners, G.J.M.; Digital Avionics Systems Conference, 2004. DASC 04. The 23$^{rd}$;vol. 1 Digital Object Identifier: 10.1109/DASC.2004.1391320; Pub. Year: 2004 , pp. 4.C. 1-41-12 vol. 1.*

(Continued)

Primary Examiner — Cuong H Nguyen
(74) Attorney, Agent, or Firm — Bracewell & Giuliani, LLP

(57) ABSTRACT

Systems, methods, computer programs, and user interfaces are provided to receive a route request including a start location and an end location, generate a route from the start location to the end location, the route including a number of route segments, determine a route proportion for each of the route segments, generate a progress style based on the route proportion of each of the route segments, and send the route and the progress style to a user device, the user device displaying a segment progress to scale for a current route segment of the route segments based on the progress style.

19 Claims, 9 Drawing Sheets

(56) References Cited

U.S. PATENT DOCUMENTS

| | | | |
|---|---|---|---|
| 2003/0069683 A1* | 4/2003 | Lapidot et al. | 701/117 |
| 2004/0218894 A1* | 11/2004 | Harville et al. | 386/46 |
| 2007/0078599 A1 | 4/2007 | Yoshioka et al. | |
| 2007/0106468 A1 | 5/2007 | Eichenbaum | |
| 2008/0052638 A1 | 2/2008 | Frank et al. | |
| 2008/0097731 A1* | 4/2008 | Lanes et al. | 703/2 |
| 2008/0300778 A1 | 12/2008 | Kuznetsov | |
| 2008/0312819 A1 | 12/2008 | Banerjee | |
| 2009/0140887 A1 | 6/2009 | Breed et al. | |
| 2009/0240431 A1 | 9/2009 | Chau | |
| 2009/0276118 A1 | 11/2009 | Shen | |
| 2009/0310325 A1 | 12/2009 | Wong | |
| 2009/0325607 A1* | 12/2009 | Conway et al. | 455/456.3 |
| 2010/0017112 A1 | 1/2010 | Sim | |
| 2010/0057336 A1 | 3/2010 | Levine | |
| 2010/0082820 A1* | 4/2010 | Furukawa | 709/227 |
| 2010/0125410 A1 | 5/2010 | Hicks | |
| 2010/0161370 A1 | 6/2010 | Bloom | |
| 2010/0250115 A1* | 9/2010 | Ohata et al. | 701/201 |
| 2010/0305847 A1* | 12/2010 | Gluck | 701/201 |
| 2010/0318285 A1 | 12/2010 | Kim | |
| 2011/0010241 A1* | 1/2011 | Mays | 705/14.49 |
| 2011/0022313 A1 | 1/2011 | Bugnariu | |
| 2011/0060523 A1 | 3/2011 | Baron | |
| 2011/0112717 A1 | 5/2011 | Resner | |
| 2011/0130950 A1 | 6/2011 | Wexler | |
| 2011/0178697 A1 | 7/2011 | Mincey | |
| 2011/0191017 A1 | 8/2011 | Certin | |
| 2012/0046861 A1* | 2/2012 | Feldbauer | 701/426 |
| 2012/0173137 A1 | 7/2012 | Compton et al. | |
| 2012/0194530 A1* | 8/2012 | Riach et al. | 345/536 |

FOREIGN PATENT DOCUMENTS

| | | | |
|---|---|---|---|
| WO | WO 9204683 A | * | 3/1992 |
| WO | 2004114592 A1 | | 12/2004 |
| WO | 2009046134 A1 | | 4/2009 |

OTHER PUBLICATIONS

Integrated Tourist Navigation System; Haomian Wang; Weiwei Cui; Hong Zhou; Yingcai Wu; Huamin Qu; Computer Graphics, Imaging and Visualization, 2009. CGIV '09. Sixth International Conference on; Digital Object Identifier: 10.1109/CGIV.2009.45 Publication Year: 2009 , pp. 497-502.*

Software design and development for automotive online monitoring system; Norma, N.H.; Saad, Z.; Isa, I.S.; Ishak, S. Signal Processing and its Applications (CSPA), 2011 IEEE 7th International Colloquium on; Topic(s): Communication, Networking & Broadcasting ; Components, Circuits, Devices & Systems ; Computing & Processing (Hardware/Software).*

Ragghubir, et al., "Spatial Categorization and Time Perception: Why Does it Take Less time to Get Home?", Journal of Consumer Psychology, Aug. 30, 2010.

Ibm et al., "Method of Integrating Profile-Based Add-on Services for Generating Driving Directions", IP.COM, Oct. 29, 2007.

An expert system for tourists using Google Maps API; Pejic, A.; Pletl, S.; Pejic, B.; Intelligent Systems and Informatics, 2009. SISY '09. 7th International Symposium on; Digital Object Identifier: 10.11 09/SISY.2009.5291141 ; Publication Year: 2009, pp. 317-322.

Integrated Google Maps and smooth street view videos for route planning; Chi Peng; Bing-Yu Chen; Chi-Hung Tsai; Computer Symposium (ICS), 2010 International; Digital Object Identifier: 10.11 09/COMPSYM.201 0.5685494; Publication Year: 2010, pp. 319-324.

Integration of nomadic devices with automotive user interfaces; Gil-Castineira, F.; Chaves-Dieguez, D.; Gonzalez-castano, F.J.; Consumer Electronics, I EEE Transactions on; vol. 55, Issue: 1; Digital Object Identifier: 10.11 09/TCE.2009.4814411; Publication Year: 2009, pp. 34-41.

Zekeng, Liang. "The Usher System to Generate Semantic Personalised Maps for Travellers", 2010. pp. 49-71.

Arikawa, Masatoshi, et al., "NAVITIME: Supporting Pedestrian Navigation in the Real World", IEEE, Jul.-Sep. 2007, pp. 21-29.

* cited by examiner

METHOD, SYSTEM, AND COMPUTER PROGRAM PRODUCT FOR VISUALIZING TRIP PROGRESS

TECHNICAL FIELD

The present disclosure relates to a process for visualizing trip progress. More specifically, embodiments of the present disclosure visualize trip progress with respect to travel distance or estimated travel time to scale.

BACKGROUND

Modern smart phones and navigation devices are typically equipped with mapping capabilities. For example, a user of these devices may use the mapping capabilities to locate a point of interest or to plan for a trip. In addition, smart phone and navigation devices may be equipped with global positioning system (GPS) capabilities. In this case, GPS may be used on these devices to obtain maps of the geographic area at the device's location. Once located, the device may be used to navigate (by driving, using public transportation, walking, etc.) to a point of interest selected by the user. Specifically, the device may provide turn-by-turn directions and show the progress, of the user along a mapped route in real-time.

Progress shown along a mapped route may lack information useful for determining an overall progress for a trip. Further, turn-by-turn directions for the route may not allow the user to determine the proportion of each segment of the trip.

SUMMARY

Various embodiments of systems, methods, computer programs, and user interfaces for visualizing trip progress are described herein. In some aspects, provided are a system, method, computer program, and user interface for receiving a route request including a start location and an end location, generating a route from the start location to the end location, the route including a number of route segments, determining a route proportion for each of the route segments, generating a progress style based on the route proportion of each of the route segments, and sending the route and the progress style to a user device, the user device displaying a segment progress to scale for a current route segment of the route segments based on the progress style.

In some aspects, the route proportion of each of the route segments is a segment distance or an estimated segment travel time. In some aspects, the system, method, computer program, and user interface are further for generating the progress style includes determining a minimum proportion for the route segments, where the current route segment is rendered with a minimum display size based on the route proportion of the current route segment failing to exceed the minimum proportion. In some aspects, the system, method, computer program, and user interface are further for generating the progress style includes determining a maximum proportion for the route segments, where the current route segment is rendered with a maximum display size based on the route proportion of the current route segment exceeding the maximum proportion.

In some aspects, the system, method, computer program, and user interface are further for determining a corresponding segment type for each of the route segments, where each of the route segments is displayed based on the corresponding segment type.

Figure 1A:
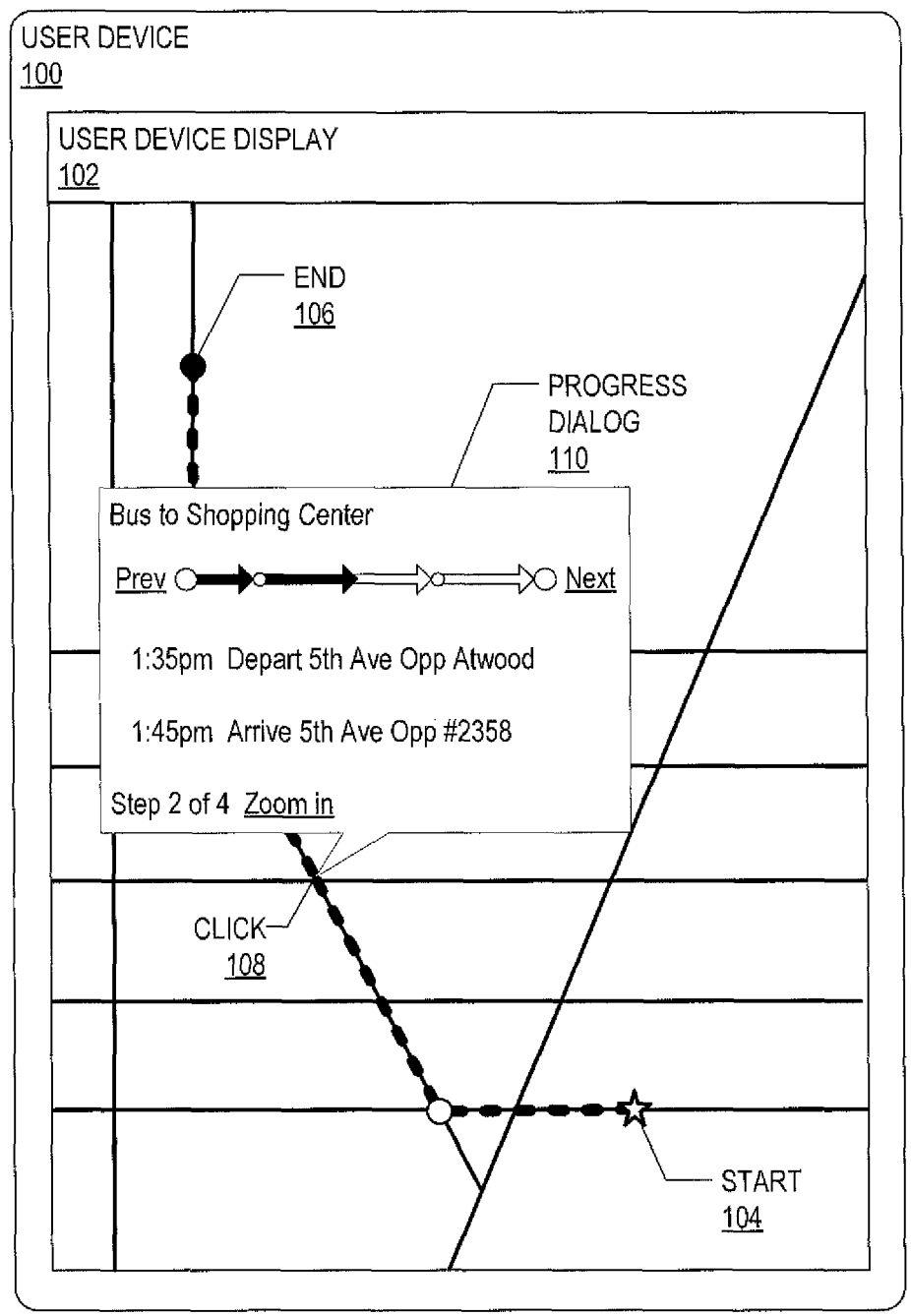
FIGS. 1A-1B show example route maps in accordance with one or more embodiments.

While visualizing trip progress is susceptible to various modifications and alternative forms, specific embodiments thereof are shown by way of example in the drawings and will herein be described in detail. The drawings may not be to scale. It should be understood, however, that the drawings and detailed description thereto are not intended to limit visualizing trip progress to the particular form disclosed, but to the contrary, the intention is to cover all modifications, equivalents, and alternatives falling within the spirit and scope of the present disclosure as defined by the appended claims.

DETAILED DESCRIPTION

As discussed in more detail below, provided in some embodiments are systems and methods for visualizing trip progress, which may be useful for a map service, navigation service, or other applications in which turn-by-turn directions are presented or analyzed. In one embodiment, the process for visualizing trip progress includes the steps of generating a route from a start location to an end location, determining a route proportion for route segments of the route, generating a route style based on the route proportion of the route segments, and sending the route and the route style to a mobile user device. In some embodiments, the mobile user device displays a segment progress to scale for a current route segment of the route based on the route style.

A route may correspond to directions for traveling from a start location to an end location. The route may include route segments separated by decision points, which are locations where the direction of the route changes (e.g., a turn onto a road, a transfer to a public transit vehicle, etc.). The end location may be a point of interest selected by the user. Examples of points of interest are restaurants, museums, retail stores, etc.

Figure 1B:
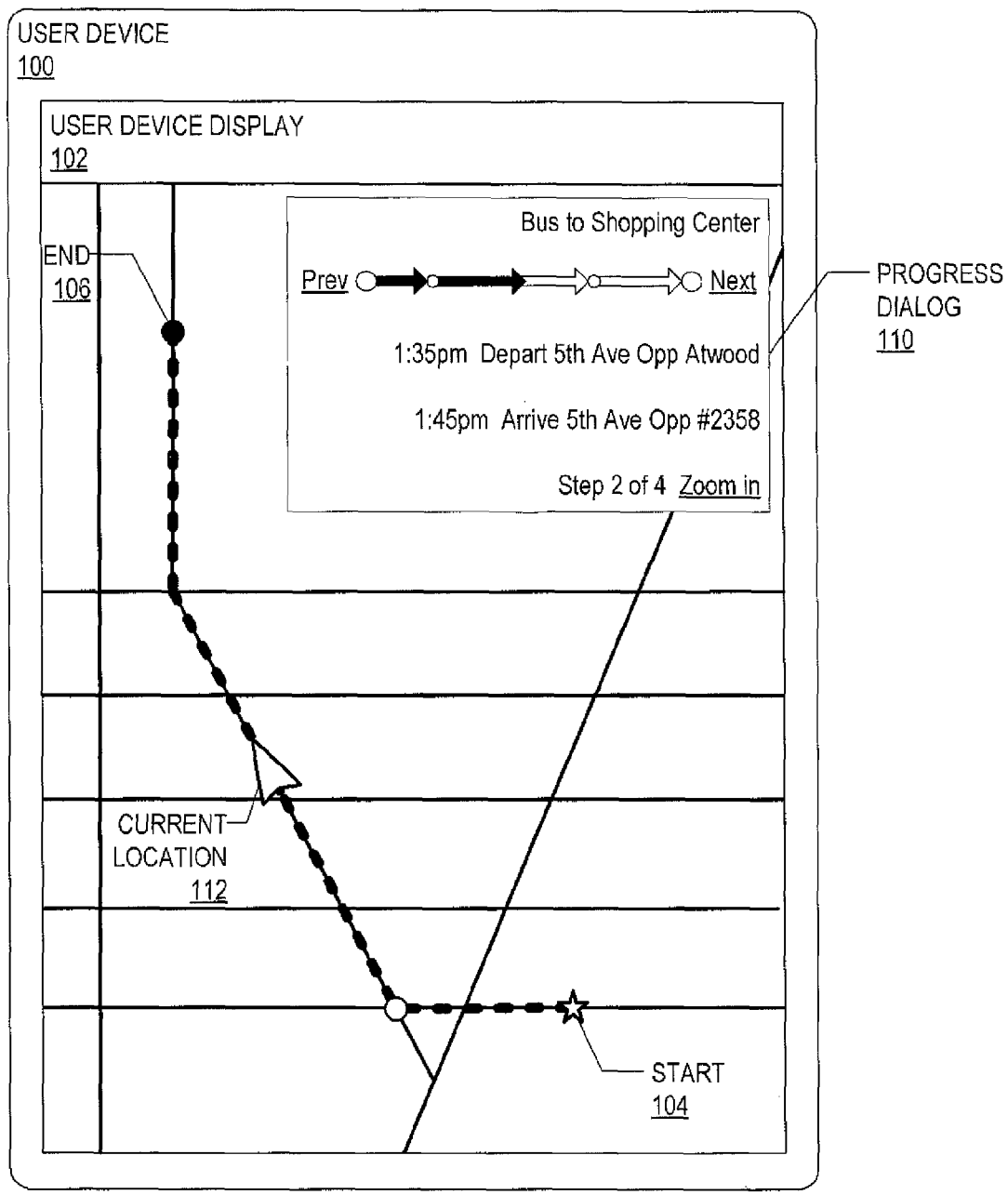

FIGS. 1A and 1B show exemplary route maps in accordance with certain embodiments of visualizing trip progress. FIG. 1A shows an example map on a user device display 102 of a user device 100. The example map includes a route from a start location 104 to an end location 106. As shown in FIG. 1A, a user click 108 is detected by the user device display 102 on the route. In response to the user click 108, a progress dialog 110 is rendered. The progress dialog 110 includes a trip progress bar showing three segments of the route from the start location 104 to the end location 106. The proportion of the route segments shown in the trip progress bar matches the proportion the travel distance of each route segment shown in the example map. Specifically, the trip progress bar shows that the user device 100 has traveled along approximately half of the largest middle segment of the route.

As shown in FIG. 1B, the example map includes a route from a start location 104 to an end location 106. The example map of FIG. 1B includes a current location 112 of the user device 100 along the route. In this case, the current location 112 of the user device 100 is tracked in real-time on the trip progress bar rendered in the progress dialog 110. For example, the user device display 102 of FIG. 1B may show a navigation service as the user device 100 travels from the start location 104 to the end location 106. In this example, the progress of the user device 100 is shown to scale in real time on the trip progress bar, allowing the user to spatially determine (1) the user device's overall progress along the route and (2) the user device's segment progress on the current route segment. The progress dialog 110 also shows a description of the current route segment.

Figure 2:
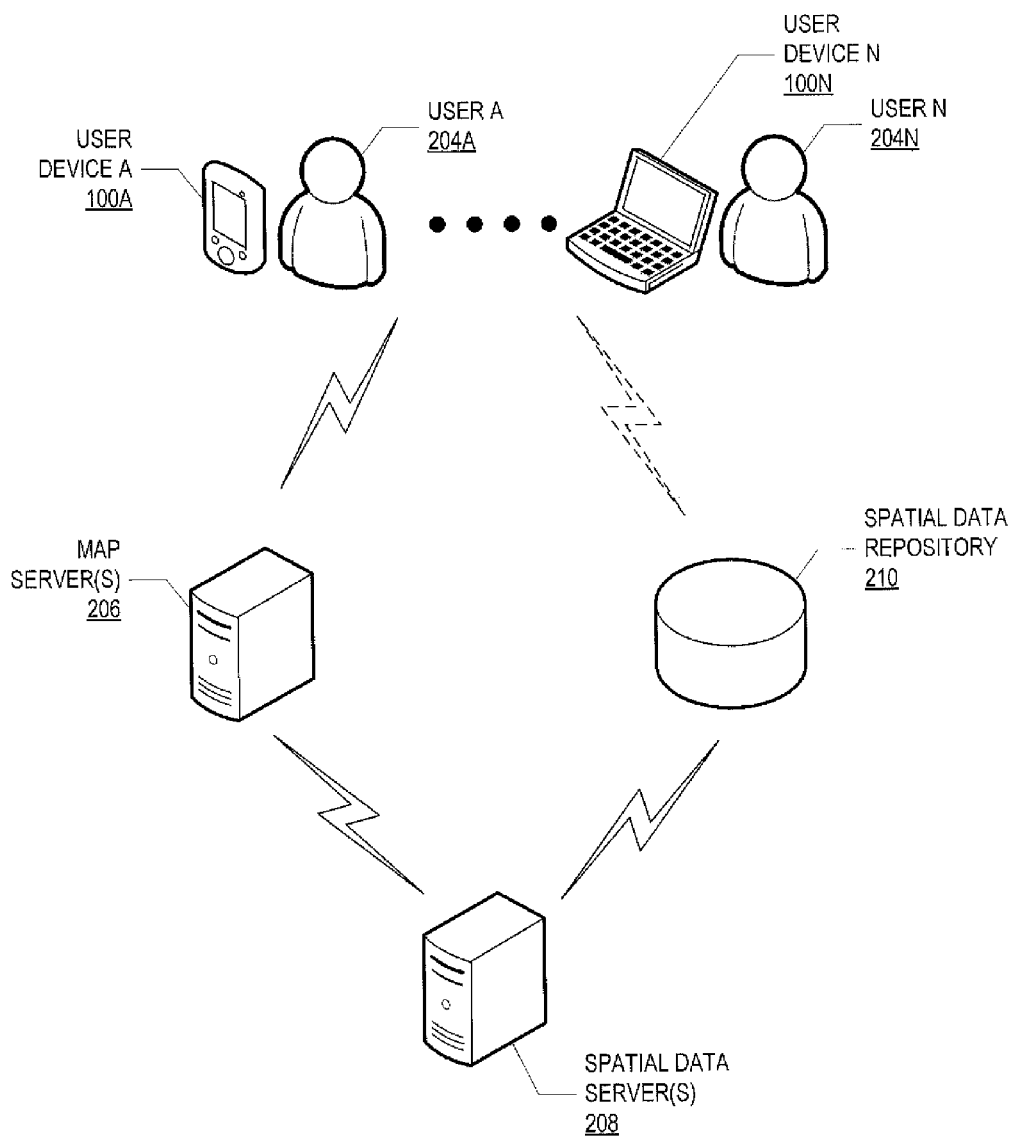
FIGS. 2 and 3A-3D show diagrams of systems in accordance with one or more embodiments.

FIG. 2 shows a diagram of a system in accordance with one embodiment. The system of this embodiment includes user devices (e.g., user device A 100A and user device N 100N) interacting with map server(s) 206, which in turn interact with spatial data server(s) 208. The illustrated spatial data server 208 stores information in a spatial data repository 210. FIG. 2 describes further aspects of the aforementioned components of FIG. 2.

Examples of user devices (e.g., user device A 100A, user device N 100N) include smartphones, tablet computers, laptop computers, etc. Each of the user devices (e.g., user device A 100A, user device N 100N) may be equipped to communicate with a positioning device (not shown) to determine a location of the user device. The user devices may then perform map and navigation services using the location obtained from the positioning device. As shown in FIG. 2, the user devices (e.g., user device A 100A, user device N 100N) in this example are operated by users (e.g., user A 204A, user N 204N).

Each of the map server(s) 206 may be implemented on multiple computing devices (i.e., servers), where a load balancing scheme distributes requests across the multiple computing devices. The map server 206 is configured to provide maps, geographic coordinates, directions, etc. to the user devices (e.g., user device A 100A, user device N 100N). For example, the map server 206 may provide a route and corresponding route information for displaying trip progress to scale on a user device A 100A. Alternatively or additionally, the map server 206 may, in some embodiments, also provide turn-by-turn directions to a point of interest for the user A 204A on the user device A 100A. The map server 206 may be configured to obtain spatial data for maps from the spatial data server(s) 208.

In some embodiments, additional repositories at the same or different location as the spatial data repository 210 may also be queried by the map service server 208 to generate routes for the user devices (e.g., user device A 100A, user device N 100N).

In some embodiments, the spatial data server 208 is configured to obtain and store spatial data in the spatial data repository 210. The stored spatial data may be later transmitted by the spatial data server 208 in response to requests from map server 206 for spatial data to be used in route maps, or the stored spatial data may be analyzed by a spatial data analysis module to generate data based on the spatial data, e.g., to generate route segment information, to generate a progress style, etc. Specifically, in this embodiment, the spatial data server 208 is configured to perform spatial queries for spatial data in the spatial data repository 210 and to send the spatial data to the map server 206. The spatial data may be used by the map server 206 to obtain a route and route segmentation information for displaying trip progress to scale on the user devices (e.g., user device A 100A, user device N 100N) for the users (e.g., user A 204A, user N 204N).

For example, if user A 204A is traveling with user device A 100A, the map server 206 may receive a route request including a start location and an end location from user device A 100A. The map server 206 may then process the route request to extract user parameters, which are forwarded to the spatial data server 208. In this case, the spatial data server 208 may obtain a route and route segment information by applying a routing algorithm to relevant roads from the spatial data repository 210.

In response to receiving the route and route segment information from the spatial data server 208, the map server 206 may generate a progress style based on the route segment information. At this stage, the map server 206 prepares a route map for the user device A 100A. For example, the map server 206 may generate the route map as a map image based on the route and a route style and then send the map image to the user device A 100A (i.e., server-side map image). In another example, the map server 206 may provide the route and the route style to the user device A 100A, which dynamically generates a route map based on the route and the route style (i.e., client side dynamic map). In either case, the map server 206 may also provide the route segment information and progress style to the user device A 100A. In some embodiments, a trip progress to scale may be displayed for the user A 204A of the user device A 100A based on the route segment information.

Figure 3A:
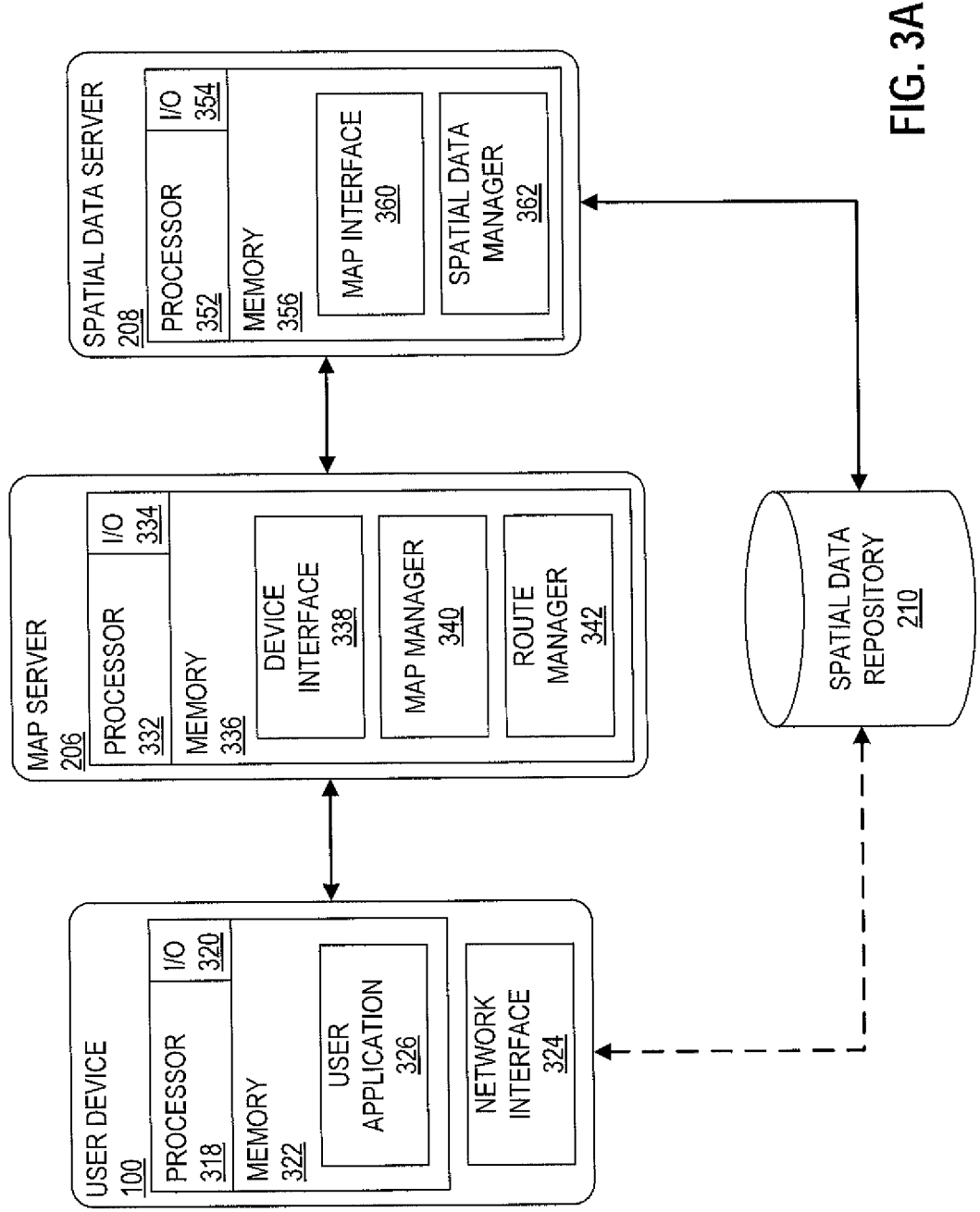

FIG. 3A shows a diagram of a system in accordance with some embodiments of visualizing trip progress. The example system includes a user device 100 communicating with (e.g., interacting, receiving broadcasts from, or transmitting broadcasts to) a map server 206, which in turn interacts with a spatial data server 208. Further, the spatial data server 208 of this embodiment stores information in a spatial data repository 210.

In some embodiments, the user device 100 is a personal computer. For example, the user device 100 may be a desktop computer, a laptop computer, a smartphone, a tablet computer, a navigation device, a wirelessly-networked imaging device, a wirelessly-networked e-reader, an on-board computer of a vehicle, or other device with a connection to a network. In some embodiments, the user device 100 includes a network interface 324 configured to send data to and receive data from the map server 206. For instance, the network interface 324 may send map requests to and receive maps from the map server 206.

In some embodiments, the user device 100 includes a processor 318, an input/output module 320, and a memory 322. The user device 100 may be implemented as a computing device with an operating system, stored in the memory 322, for interacting with a user. For example, the operating system may be configured to provide applications (e.g., a map application, a social networking application, etc.) to the user. In some embodiments, the memory 322 includes a user application 326.

In some embodiments, the user application 326 of the user device 100 is configured to provide map services to a user. For example, the user application 326 may be configured to (1) obtain route maps and corresponding route segment information; (2) display trip progress to scale based on the route segment information; and/or (3) transmit map requests to the map server 206. The user application 326 may include location information 366 of FIG. 3B describing the location (e.g., longitude and latitude) of the user device 100. The location information 366 of FIG. 3B may be obtained for the user device 100 from a positioning device (not shown). For example, the absolute location of the user device 100 may be determined based on GPS signals received from GPS satellites. In this example, the absolute location may be geographic coordinates identifying the location of the user device 100 in a geographic coordinate system. In another example, the relative location of the user device 100 may be determined based on mobile phone signals received from one or more mobile network towers. In this example, the relative location may specify the location of the user device 100 with reference to the mobile network towers.

Figure 3C:
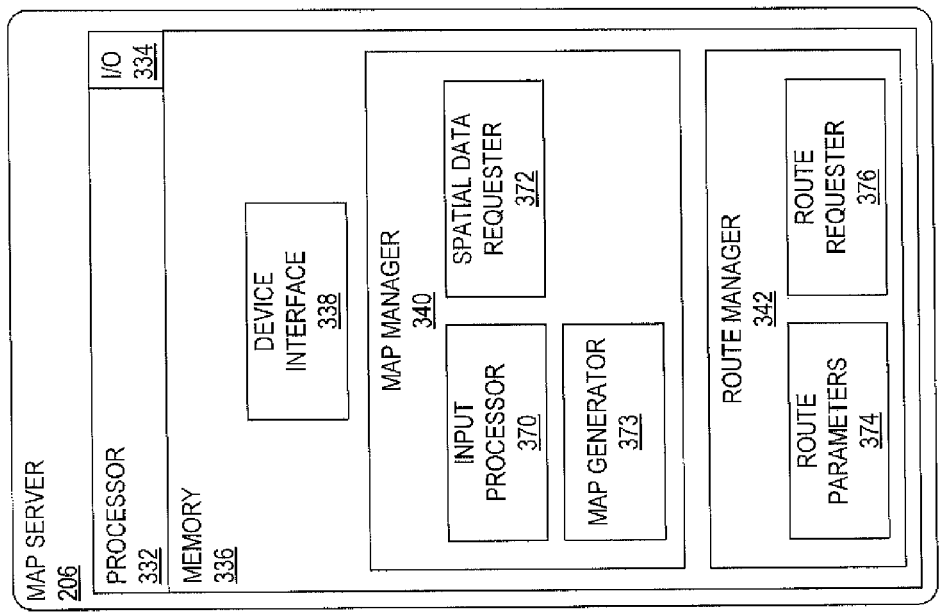
Figure 3B:
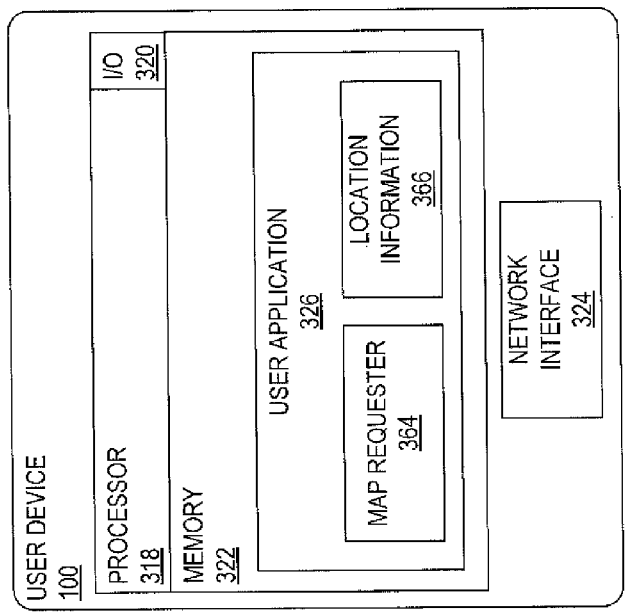

In some embodiments, the user application 326 further includes a map requester 364 of FIG. 3B configured to obtain maps from the map server 206. For example, the map requester 364 of FIG. 3B may send a map request requesting a route map based on a start location and an end location. In this example, the map request may include user parameters such as, a start location, routing configurations, etc. The map requester 364 of FIG. 3B may be configured to receive the requested maps from the map server 206 and to display the maps for the user.

In some embodiments, the map server 206 includes a processor 332, an input/output module 334, and memory 336. The map server 206 may include various types of computing devices that execute an operating system. The processor 332 may execute instructions, including instructions stored in the memory 336. The instructions, like the other instructions executed by computing devices herein, may be stored on a non-transitory computer readable medium such as an optical disk (e.g., compact disc, digital versatile disk, etc.), a flash drive, a hard drive, or any other computer readable storage device. The input/output module 334 of the map server 206 may include an input module, such as a radio frequency sensor, a keyboard, a touch screen, and/or a mouse, and an output module, such as a radio frequency transmitter, a printer, and/or a monitor. The map server 206 may be connected to a local area network (LAN) or a wide area network (e.g., the Internet) via a network interface connection. In some embodiments, the input/output module 334 may take other forms.

Further, the map server 206 may be implemented as a node of a distributed system, where the other portions of the distributed system are located on different nodes. The nodes of the distributed system may correspond to computing devices as discussed above. Alternatively, the nodes of the distributed system may correspond to multiple processors/cores with shared memory in a single computing device. In some embodiments, the memory 336 includes a device interface 338, a map manager 340, and a route manager 342. The aforementioned components of the map server 206 may be implemented on multiple computing devices (i.e., servers), where a load balancing scheme distributes requests across the multiple computing devices.

In some embodiments, the device interface 338 of the map server 206 is configured to process maps requests from the user device 100. The device interface 338 may be configured to extract user parameters from the map requests and to forward the extracted user parameters to the map manager 340. For example, the user parameters may include a start location, an end location, and routing configurations. Routing configurations may specify routing parameters such as obtain shortest route, obtain fastest route, avoid highways, avoid tollways, use public transportation, etc. for generating a route by a routing algorithm. The device interface 338 may be configured to obtain requested, maps from the map manager 340 for providing to the user device 100.

In some embodiments, the map manager 340 includes an input processor 370 of FIG. 3C configured to process user parameters received from the device interface 338. The input processor 370 of FIG. 3C may be configured to process the user parameters to identify spatial data (e.g., points of interest, turn-by-turn directions, etc.) for generating the requested maps. For example, the input processor 370 of FIG. 3C may identify a road layer having spatial data for building a route map based on user parameters requesting a route from a current location to an end location. In some embodiments, the map manager 340 includes a spatial data requester 372 of FIG. 3C configured to obtain the spatial data identified by the input processor 370 of FIG. 3C from the spatial data server 208. In another example, the input processor 370 of FIG. 3C may determine that turn-by-turn directions are requested based on the user parameters. In this example, the input processor 370 of FIG. 3C may determine route parameters (e.g., start location, end location, traveling preferences, etc.) based on the user parameters, where the route parameters 374 of FIG. 3C are provided to the route manager 342.

In some embodiments, a map layer includes spatial features (e.g., points, polylines, polygons, vectors, etc.) of a data type (e.g., points of interest, transit routes, roads, cities, rivers, state boundaries, etc.) for presenting in a map. For example, a roads map layer may include polylines for roads in a geographic area. In another example, a points of interest map layer may include points for interesting locations in a geographic area.

In some embodiments, spatial data describes the geographic location of features (e.g., points of interest, cities, geo-located images, etc.) and boundaries (e.g., rivers, county boundaries, state boundaries, country boundaries, etc.). Typically, spatial data is stored in the form of points, polylines, polygons, vectors, imagery, or some other shape. For example, geographic coordinates and associated metadata for points of interest may be stored in a point map layer. In another example, boundaries and associated metadata for geographic areas may be stored in a polygon map layer. Spatial queries may be performed between mapping layers by performing spatial comparisons (e.g., comparisons for intersections, comparisons for disjointedness, etc.) of the shapes in each of the mapping layers.

In some embodiments, the map manager 340 includes a spatial data requester 372 of FIG. 3C configured to obtain spatial data (e.g., points of interest, roads, etc.) from the spatial data server 208 based on the user parameters. The spatial data request may specify a map scale (i.e., a ratio of map distance to corresponding actual distance on the ground) and a map extent (i.e., the outer bounds of the geographic area shown in a map) for a requested route map. For instance, if the user parameters request a detailed route map to a nearby end location, the spatial data request may specify a larger scale (e.g., one centimeter to 100 meters) and a map extent of a few square kilometers.

In some embodiments, the spatial data requester 372 of FIG. 3C is configured to also obtain map styles from the spatial data server 310 for rendering the spatial data. A map style may specify various rules for rendering spatial data such as label font color, label font size, label position, polyline thickness, fill color of spatial features, etc. Map styles may be defined for map layers, labels, progress bars, symbols, points of interest, routes, or other map features. For instance, a progress style may specify that a trip progress bar should be rendered (1) to show an overall progress on the route with (2) route segments drawn to scale with respect to travel time or travel distance. In this case, the progress style may also specify a minimum or maximum proportion for rendering route segments in the trip progress bar. For example, a minimum proportion may specify that each route segment displayed in the trip progress bar should be rendered with a minimum display size.

In some embodiments, the map manager 340 includes a map generator 373 of FIG. 3C configured to generate maps using the spatial data obtain by the spatial data requester 372 of FIG. 3C. The map generator 373 of FIG. 3C may generate route maps for the device interface 338 to provide to the user device 100 in response to map requests. For example, the map generator 373 of FIG. 3C may consolidate the spatial data and corresponding map styles for a route map, where the spatial data and map styles are transmitted by the device interface 338 to the user device 100. In this example, the route map may be dynamically rendered by the user application 326 of the user device 100 (i.e., client-side dynamic map). In another example, the map generator 373 of FIG. 3C may generate a map image based on the spatial data and corresponding map styles for a route map, where the map image is transmitted by the device interface 338 to the user device 100 (i.e., server-side map image). In some embodiments, when requested by the user parameters, the map generator 373 of FIG. 3C may be configured to obtain turn-by-turn directions from the route manager 342.

In some embodiments, the route manager 342 of the map server 206 is configured to obtain routes for map requests of user devices (e.g., user device 100). Specifically, the route manager 342 may include: (1) route parameters 374 of FIG. 3C received from the input processor 370 of FIG. 3C and (2) a route requester 376 of FIG. 3C configured to obtain routes and/or turn-by-turn directions based on the route parameters 374 of FIG. 3C from the spatial data server 208. In some embodiments, the route parameters 374 of FIG. 3C may include a start location, an end location, and routing configurations.

In some embodiments, the spatial data server 208 is a computing device configured to provide spatial data to map servers (e.g., map server 206) and user devices (e.g., user device 100). In some embodiments, the spatial data server 208 includes a processor 352, an input/output module 354, and a memory 356. The spatial data server 208 may be implemented as a computing device with similar characteristics as discussed above with respect to the map server 206. In some embodiments, the memory 356 includes a map interface 360 and a spatial data manager 362. The aforementioned components of the spatial data server 208 may be implemented on multiple computing devices (i.e., servers), where a load balancing scheme distributes requests across the multiple computing devices.

In some embodiments, the map interface 360 of the spatial data server 208 is configured to process spatial data requests from the map server 206. Specifically, the map interface 360 may include a map server interface 384 of FIG. 3D configured to (1) receive spatial data requests from the map server 206 and (2) send requested spatial data to the map server 206. The map server interface 384 of FIG. 3D may forward spatial data requests received from the map server 206 to the spatial data manager 362 for processing. In some embodiments, the map interface 360 includes a map style provider 386 of FIG. 3D configured to obtain map styles for the map server 206. For example, the map style provider 386 of FIG. 3D may be configured to obtain map styles related to requested spatial data (e.g., spatial features, routes, etc.) from the spatial data repository 210. In this example, the map styles related to the requested spatial data may also be sent to the map server 206 by the map server interface 384 of FIG. 3D.

In some embodiments, the spatial data manager 362 of the spatial data server 208 is configured to manage spatial data stored in the spatial data repository 210. The spatial data manager 362 may include a spatial data interface 388 of FIG. 3D configured to access and modify data in the spatial data repository 210. For example, the spatial data interface 388 of FIG. 3D may be configured to execute database commands to retrieve or modify database records in the spatial data repository 210. In an exemplary embodiment, the spatial data interface 388 of FIG. 3D may be used by the other modules (e.g., spatial operator 390, spatial comparer 392, spatial query builder 394, spatial routing engine 396) of the spatial data manager 362 to perform spatial or data operations.

Figure 3D:
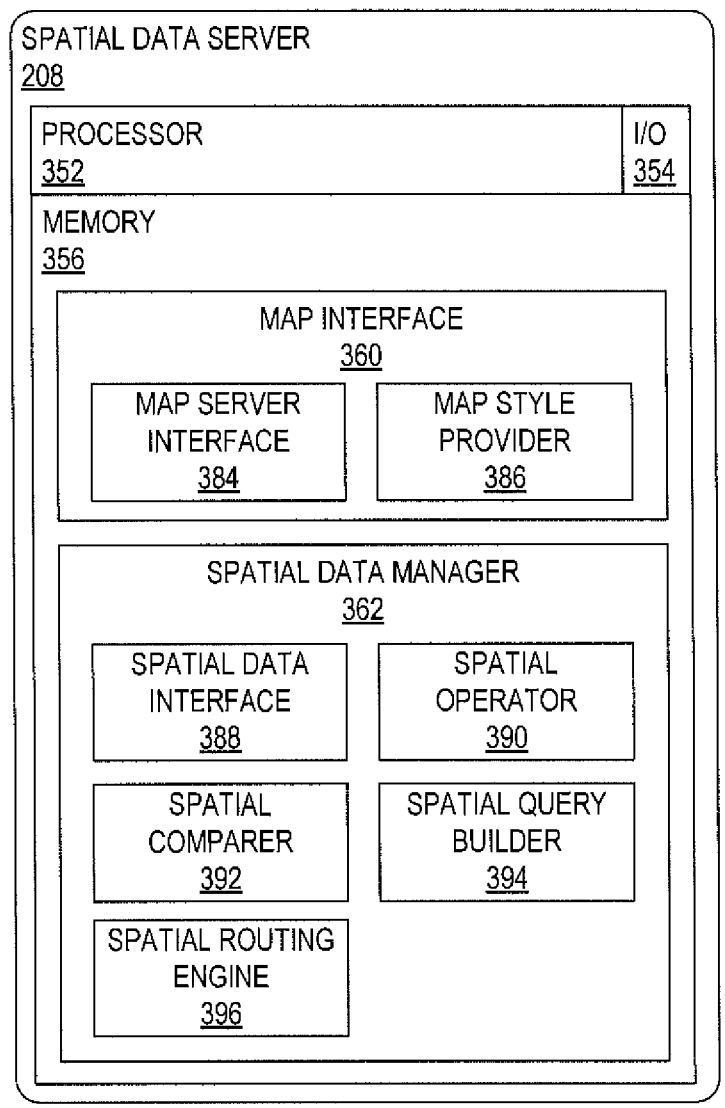

In some embodiments, the spatial data manager 362 may include a spatial operator 390 of FIG. 3D configured to perform spatial operations on spatial data. Examples of spatial operations may include intersecting spatial features, snapping one spatial feature to another, unioning spatial features, buffering a spatial feature, and differencing spatial features. The spatial operator 390 of FIG. 3D may perform the spatial operations on spatial data retrieved from the spatial data repository 210 by the spatial data interface 388 of FIG. 3D. In this case, the results of the spatial operation may be stored in the spatial data repository 210 by the spatial data interface 388 of FIG. 3D.

In some embodiments, the spatial data manager 362 may include a spatial comparer 392 of FIG. 3D configured to perform spatial comparisons of spatial data. Examples of spatial comparisons may include determining whether spatial features intersect, determining whether a spatial feature is contained by another spatial feature, determining whether a spatial feature contains another spatial feature, determining whether spatial features are disjoint, determining whether a spatial feature is equal to another spatial feature, and determining whether a spatial feature touches another spatial feature. The spatial comparer 392 of FIG. 3D may perform the spatial comparisons on spatial data retrieved from the spatial data repository 210 by the spatial data interface 388 of FIG. 3D.

In some embodiments, the spatial data manager 362 may include a spatial query builder 394 of FIG. 3D configured to generate database commands for retrieving or modifying spatial data in the spatial data repository 210. For instance, the spatial query builder 394 of FIG. 3D may build structured query language (SQL) statements for retrieving or modifying spatial data. In this case, the spatial data interface 388 of FIG. 3D may be configured to execute the SQL statements to retrieve or modify spatial data in the spatial data repository 210.

In some embodiments, the spatial data manager 362 may include a spatial routing engine 396 of FIG. 3D configured to determine routes based on route parameters. For instance, the spatial routing engine 396 of FIG. 3D may be configured to determine routes from start locations and end locations. In this case, each route may be determined using a routing algorithm having various configurations (e.g., obtain shortest route, obtain fastest route, avoid highways, avoid tollways, use public transportation) that are specified in the routing parameters. In an exemplary embodiment, the spatial routing engine 396 of FIG. 3D may determine a route represented by a polyline with associated route information (e.g., travel distance, travel time, turn-by-turn directions, etc.) based on spatial data from a road layer that is stored in the spatial data repository 210. The route polyline may have a number of route segments, where the route information is also determined per segment (e.g., segment distance, segment travel time, etc.). In this case, each of the route segments may be associated with a segment type (e.g., a driving segment, a walking segment, a public transportation segment, a biking segment, etc.).

In some embodiments, the spatial data repository 210 is configured to store spatial data and map styles for use by a map service. The stored spatial data may include spatial features (e.g., geographic coordinates, lines, polylines, polygons, etc.) and associated metadata (e.g., road names, county names, point of interest descriptions, etc.). The spatial data repository 210 may correspond to a server, a database, files, a memory cache, etc. that is stored locally (e.g., located on the spatial data server) or shared on a network (e.g., a database server). The user device 100 may interact directly with the spatial data repository 210 to obtain spatial data to, for example, obtain real-time updates for a client side dynamic map. In some embodiments, the metadata associated with the spatial features may be stored in a separate repository (not shown). For example, the spatial data repository 210 and the separate repository may be organized in a distributed relational database architecture.

In some embodiments, the spatial data repository 210, or a related repository, is configured to store information related to the spatial data. For example, the spatial data repository 210 may also store results of analysis (e.g., turn-by-turn directions, etc.) performed on the spatial data.

Figure 4:
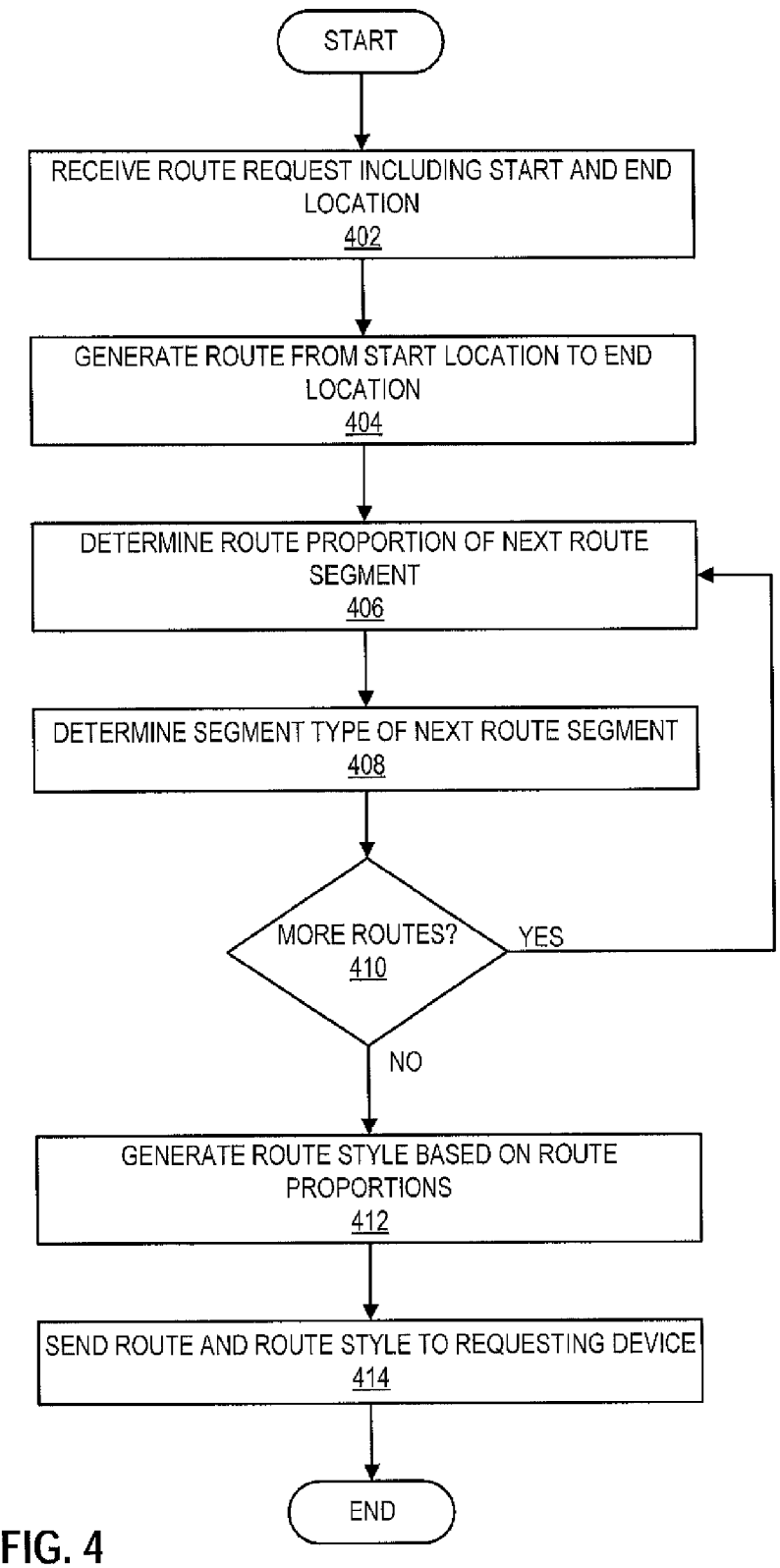
FIGS. 4-5 show flow charts in accordance with one or more embodiments.

FIG. 4 shows a flow chart in accordance with certain embodiments. More specifically, FIG. 4 is a flow chart of a method performed by a map server for obtaining a route. The route may be obtained for a map service or for other purposes. As is the case with the other processes described herein, various embodiments may not include all of the steps described below, may include additional steps, and may sequence the steps differently. Accordingly, the specific arrangement of steps shown in FIG. 4 should not be construed as limiting the scope of visualizing trip progress.

In step 402 of this embodiment, a route request including a start location and end location is received. For example, the start location may correspond to a current location of a user device, and the end location may refer to a point of interest selected by the user. In this example, the current location of the user device may be determined by a positioning device such as a global positioning system (GPS).

In step 404 of this embodiment, a route is generated based on the start location and the end location. More specifically, a routing algorithm may be applied to determine a route from the start location to the end location. For example, relevant roads obtained from a spatial data repository may be used to determine a route polyline from the start location to the end location. The route polyline may include multiple route segments, which are separated by decision points. In addition, associated route information such as estimated travel times and travel distances may also be determined for each of the route segments.

In step 406 of this embodiment, a route proportion of the next route segment is determined. For example, the route proportion of the next route segment may be the ratio of a segment travel distance of the next route segment to the travel distance of the entire route. In another example, the route proportion of the next route segment may be the ratio of an estimated segment travel time of the next route segment to the estimated travel time of the entire route. In this example, the travel times may be estimated based on the travel distances of the route/route segments and the speed limits of the relevant roads.

In step 408 of this embodiment, the segment type of the next route segment is determined. Examples of segment types include a driving segment, a walking segment, a public transportation segment, a biking segment, etc. The segment type may be determined based on the user parameters and the relevant roads obtained from the spatial data repository.

In step 410 of this embodiment, a determination is made as to whether there are more routes to process. If there are more routes to process, the flow chart returns to step 306 to process the next route segment.

If there are no more routes to process, a progress style is generated based on the route proportions in step 412. For example, the progress style may specify (1) that an overall route progress to scale should be displayed in a trip progress bar based on the travel distance or estimated travel time and (2) that route segments should be rendered in the trip progress bar to scale. In this example, the progress style may also specify a minimum and/or maximum proportion for each of the route segments. A minimum or maximum proportion may be used to determine a minimum or maximum display size, respectively, for the route segments. For the minimum proportion, a route segment with a segment proportion less than the minimum proportion is rendered with a minimum display size based on the minimum proportion.

In step 414 of this embodiment, a route map having the route is sent to the user device. For example, the route map may be generated as a map image based on the route and a route style and then sent to the user device (i.e., server-side map image). In another example, the route and the route style may be provided to the user device, which dynamically generates the route map based on the route and the route style (i.e., client side dynamic map). In either case, the progress style is also provided to the user device, which renders a trip progress bar based on the progress style.

Figure 5:
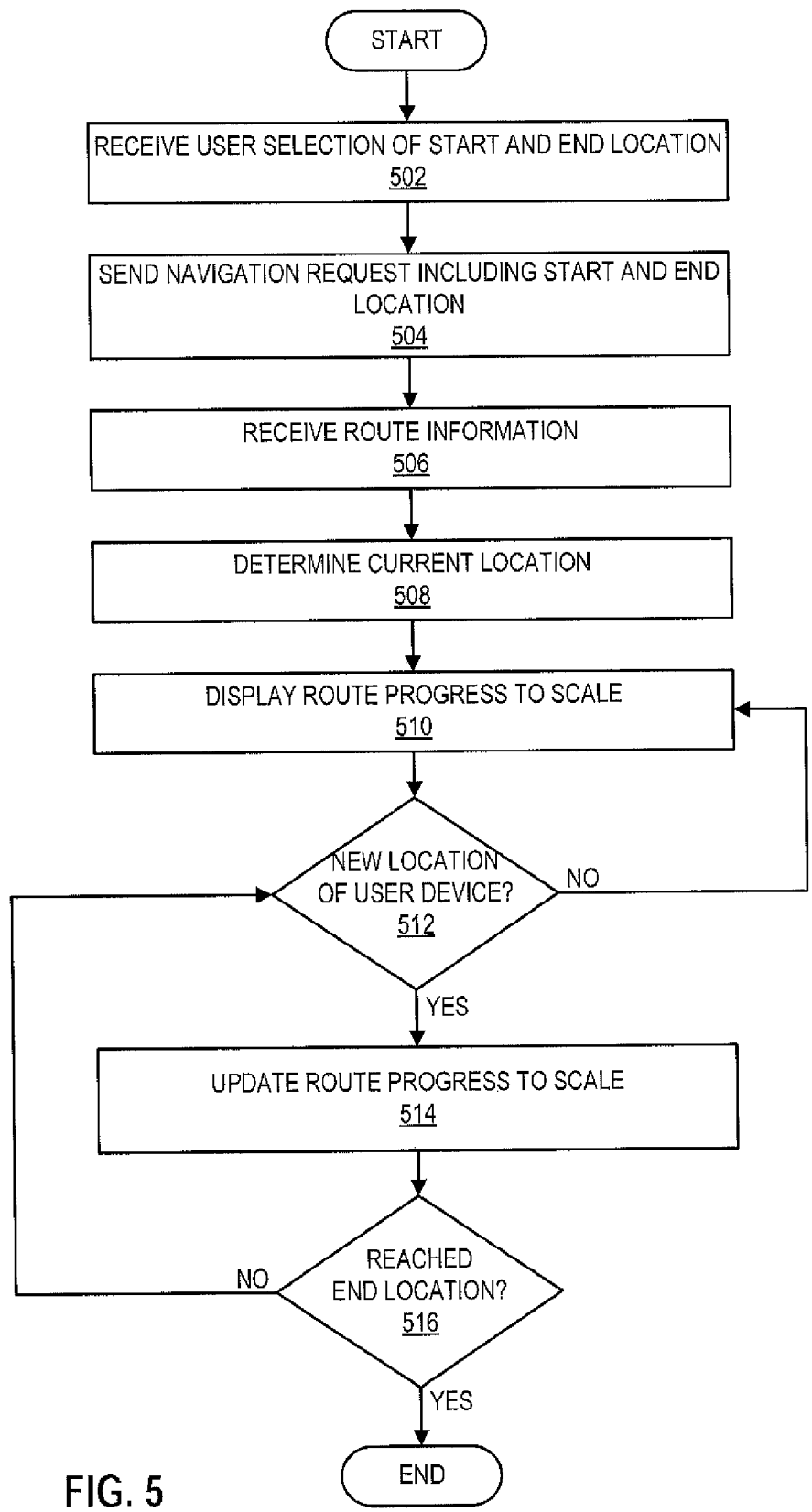

FIG. 5 shows a flow chart in accordance with certain embodiments. More specifically, FIG. 5 is a flow chart of a method performed by a user device for obtaining a route. The route may be obtained for a map service or for other purposes. As is the case with the other processes described herein, various embodiments may not include all of the steps described below, may include additional steps, and may sequence the steps differently. Accordingly, the specific arrangement of steps shown in FIG. 5 should not be construed as limiting the scope, of visualizing trip progress.

In step 502 of this embodiment, a user selection of a start location and end location are received. For example, the user may submit the start location and the end location using a map application of the user device. The start location may be a current location of the user device determined using a positioning device such as GPS. The user may select the end location by entering a street address or selecting a point of interest from a set of search results.

In step 504 of this embodiment, a route request including the start location and the end location is sent to a map server. The route request may also include other routing parameters such as various configurations (e.g., obtain shortest route, obtain fastest route, avoid highways, avoid tollways, use public transportation) for a routing algorithm.

In step 506 of this embodiment, a route and progress style are received from the map server. The route may include a route polyline having route segments and associated route information (e.g., estimated travel time, travel distance, etc.). The progress style may specify how a trip progress bar should be rendered. For example, the progress style may specify that the trip progress bar should be rendered (1) to show an overall progress on the route with (2) route segments drawn to scale with respect to estimated travel time or travel distance. In some embodiments, a segment type for each of the route segments is also obtained from the map server. Examples of segment types include a driving segment, a walking segment, a public transportation segment, a biking segment, etc.

In step 508 of this embodiment, a current location of the user device is determined. The current location of the user device may be determined by a positioning device such as a global positioning system (GPS).

In step 510 of this embodiment, a trip progress bar is rendered based on the progress style. Specifically, the trip progress bar may be rendered to show route segments to scale. For instance, the size of each route segment shown in the trip progress bar is based on the segment proportion of the total travel distance or the total estimated travel time. The display size of each route segment in the trip progress bar may also be determined based on a minimum or maximum proportion. For example, if the route proportion of a route segment is below the minimum proportion, the size of the route segment may be increased so that the size of the route segment is the minimum proportion of the trip progress bar. In some embodiments, each route segment in the trip progress bar may be rendered based on the corresponding segment type. For example, driving portions may be rendered in white while public transportation segments are rendered in blue. In this example, the user is able to graphically distinguish between each of the segment types on the route based on the trip progress bar.

In step 512 of this embodiment, a determination is made as to whether there is a new location of the user device (i.e., the position of the user device has changed). If the location of the user device has not changed, the flow chart returns to step 510 to continue to display the trip progress bar with the previous location. If the location of the user device has changed, the flow chart proceeds to step 514.

In step 514 of this embodiment, the route progress shown in the trip progress bar is updated based on the new location. Specifically, the route progress may be updated to show the new location along the trip progress bar to scale. In this case, the user device's overall progress to scale (e.g., overall progress for the total travel distance or the total estimated travel time) may be monitored by the user on the trip progress bar.

In step 516 of this embodiment, a determination is made as to whether the end location has been reached by the user device. If the end location has not been reached, the flow chart returns to step 512. If the end location has been reached, the process ends.

Figure 6:
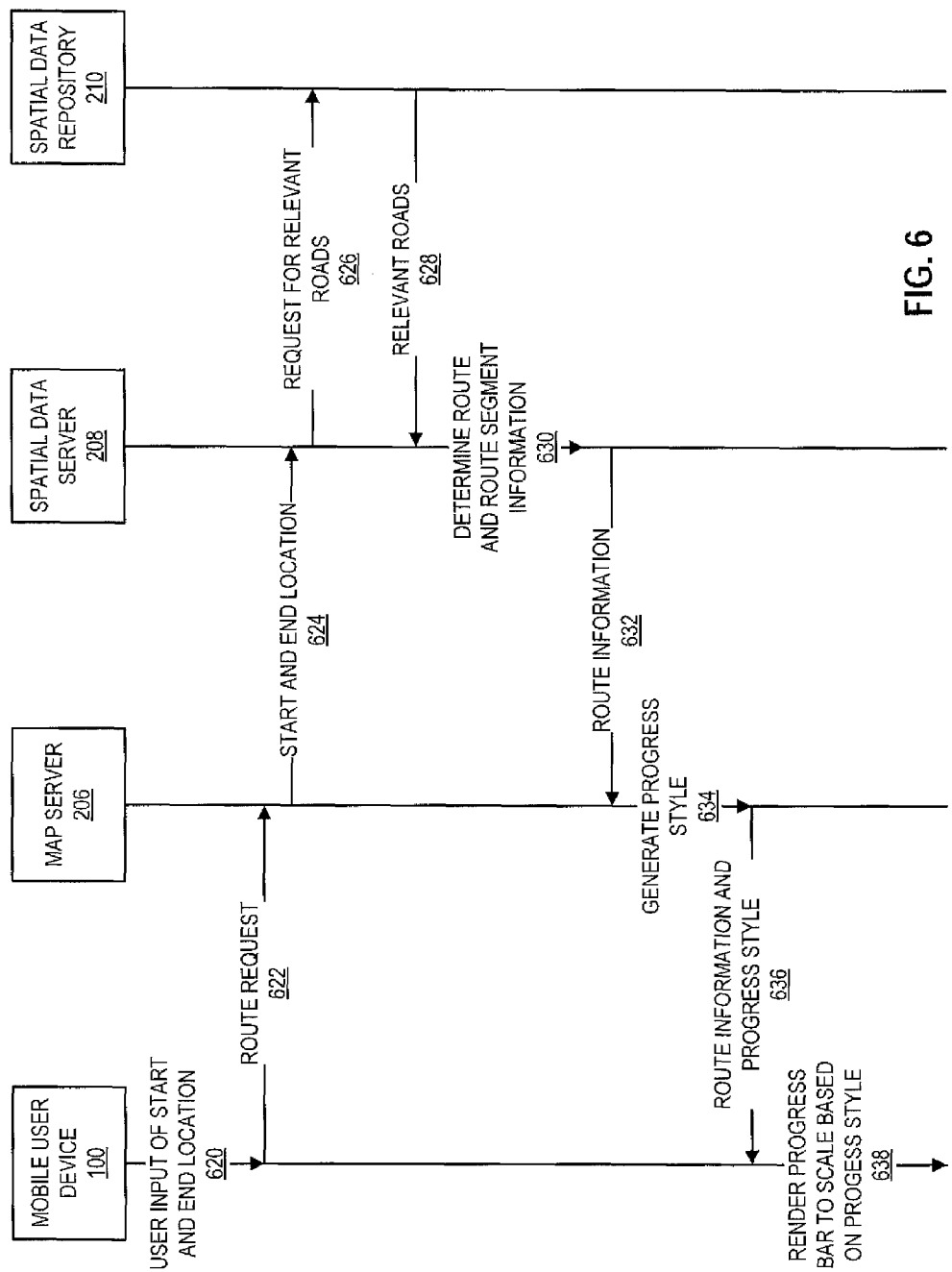
FIG. 6 shows an example data flow in accordance with one or more embodiments.

FIG. 6 shows an example data flow in accordance with embodiments of visualizing trip progress. More specifically, FIG. 6 shows an example of obtaining a route and progress style from a map server 106. The example includes a mobile user device 100, a map server 106, a spatial data server 108, and a spatial data repository 110, which may be substantially similar to their corresponding components discussed above with respect to FIGS. 2 and 3A-3D.

In step 620 of the present embodiment, the mobile user device 100 obtains user input including a start location and an end location. For example, the start location may be a current location of the mobile user device 100 determined based on a signal received from a positioning device (not shown). In this example, the end location may be a street address entered or a point of interest selected by a user of the mobile user device 100 via a user application such as a map application.

In step 622 of the present embodiment, a route request comprising the start location and the end location is sent from the mobile user device 100 to the map server 106. The map server 106 processes the route request and forwards the start location and the end location to the spatial data server 108 in step 624. In step 626 of the present embodiment, a spatial query for roads relevant to the start location and the end location is performed by the spatial data server 108 on the spatial data repository 110. The results of the spatial query are returned to the spatial data server 108 in step 628.

In step 630 of the present embodiment, the spatial data server 108 generates a route from the start location to the end location based on the relevant roads. For example, the spatial data server 108 may apply a routing algorithm to the relevant roads to determine a route polyline from the start location to the end location. In this example, the route polyline may have route segments and associate route information. In step 632 of the present embodiment, the route determined by the spatial data server 108 is sent to the map server 106.

In step 634 of the present embodiment, the map server 106 generates a progress style based on the route segments and route information. The progress style may be used to render a trip progress bar such that (1) the user of the mobile user device 100 can monitor an overall progress on the route with (2) route segments drawn to scale allowing the user to determine the relative length (in travel distance or estimated travel time) of each route segment. In step 636 of the present embodiment, the map server 106 sends the route and the progress style to the mobile user device 100.

In step 638 of the present embodiment, the mobile user device 100 renders a trip progress bar such that the progress of the mobile user device 100 on the route may be monitored in real-time. For example, the route map may be rendered as discussed above with respect to FIGS. 1A and 1B. The user of the user mobile device 100 may use the trip progress bar to monitor both his progress on a current route segment and his overall progress in real-time.

While visualizing trip progress has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present embodiments may suitably comprise, consist or consist essentially of the elements disclosed and may be practiced in the absence of an element not disclosed.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

We claim:

1. A method for visualizing trip progress, the method comprising:

receiving a route request comprising a start location and an end location;

generating by one or more processors a route from the start location to the end location, the route comprising a plurality of route segments;

determining by the one or more processors a route proportion for each of the plurality of route segments, the route proportion corresponding to a ratio of a length of the route segment to a length of the route;

generating by the one or more processors a progress style that specifies a minimum proportion for the plurality of route segments, and wherein a given one of the route segments has a route proportion that fails to exceed the minimum proportion; and sending the route and the progress style to a user device, the user device displaying a progress bar based on the progress style, wherein the progress bar comprises a plurality of progress bar segments corresponding to respective ones of the plurality of route segments, and wherein the progress bar segment corresponding to the given route segment is rendered with a minimum display size based on the route proportion of the given route segment failing to exceed the minimum proportion such that the ratio of a length of the progress bar segment corresponding to the given route segment to a length of the progress bar is greater than the ratio of a length of the given route segment to the length of the route.

2. The method of claim 1, wherein the route proportion of a route segment is a ratio of segment distance for the route segment to distance of the route or a ratio of an estimated segment travel time for the route segment to an estimated travel time of the route.

3. A non-transitory computer readable medium having computer-executable program instructions embodied therein that when executed cause a computer processor to:
receive a route request comprising a start location and an end location;
generating a route from the start location to the end location, the route comprising a plurality of route segments;
determine a route proportion for each of the plurality of route segments, the route proportion corresponding to a ratio of a length of the route segment to a length of the route;
generate a progress style that specifies a minimum proportion for the plurality of route segments, and wherein a given one of the route segments has a route proportion that fails to exceed the minimum proportion; and
send the route and the progress style to a user device, the user device displaying a progress bar for a current route segment of the plurality of route segments based on the progress style, wherein the progress bar comprises a plurality of progress bar segments corresponding to respective ones of the plurality of route segments, and wherein the progress bar segment corresponding to the given route segment is rendered with a minimum display size based on the route proportion of the given route segment failing to exceed the minimum proportion such that the ratio of a length of the progress bar segment corresponding to the given route segment to a length of the progress bar is greater than the ratio of a length of the given route segment to the length of the route.

4. The method of claim 1, wherein the progress style specifies a maximum proportion for the plurality of route segments,
wherein a given one of the route segments has a route proportion that exceeds the maximum proportion, and
wherein the progress bar segment corresponding to the given route segment is rendered with a maximum display size based on the route proportion of the given route segment exceeding the maximum proportion such that the ratio of a length of the progress bar segment corresponding to the given route segment to a length of the progress bar is less than the ratio of a length of the given route segment to the length of the route.

5. The method of claim 1, further comprising:
determining a corresponding segment type for each of the plurality of route segments, wherein each of the plurality of route segments is displayed based on the corresponding segment type.

6. A method of visualizing trip progress, the method comprising:
sending by one or more processors a route request comprising a start location and an end location;
receiving by the one or more processors route information comprising:
a route from the start location to the end location, the route comprising a plurality of route segments;
a route proportion of each of the plurality of route segments, the route proportion corresponding to a ratio of a length of the route segment to a length of the route; and
a progress style that specifies a minimum proportion for the plurality of route segments, and wherein a given one of the route segments has a route proportion that fails to exceed the minimum proportion; and
displaying a progress bar for the route based on the progress style and the route proportion of each of the plurality of route segments, wherein the progress bar comprises a plurality of progress bar segments corresponding to respective ones of the plurality of route segments, and wherein the progress bar segment corresponding to the given route segment is rendered with a minimum display size based on the route proportion of the given route segment failing to exceed the minimum proportion such that the ratio of a length of the progress bar segment corresponding to the given route segment to a length of the progress bar is greater than the ratio of a length of the given route segment to the length of the route.

7. The method of claim 6, wherein the route proportion of a route segment is a ratio of segment distance for the route segment to distance of the route or a ratio of an estimated segment travel time for the route segment to an estimated travel time of the route.

8. The method of claim 6, further comprising:
displaying a segment progress to scale for a current route segment of the plurality of route segments such that the trip progress of a user device along the route is tracked in real-time.

9. A system, comprising:
one or more memories;
one or more processors, each operatively connected to at least one of the one or more memories;
a user device interface stored on the one or more memories, the user device interface being executed by the one or more processors to:
receive a route request comprising a start location and an end location; and
send a route and a progress style to a user device, the user device displaying a progress bar for the route based on the progress style and the route proportion of each of the plurality of route segments, wherein the current route segment is rendered with a minimum display size based on a route proportion of the current route segment failing to exceed a minimum proportion for the plurality of route segments such that the ratio of a length of a progress bar segment corresponding to a given route segment having a route proportion that fails to exceed the minimum proportion to a length of the progress bar is greater than a ratio of a length of the given route segment to a length of the route; and
a mapping module stored on the one or more memories, the mapping module being executed by the one or more processors to:

generate the route from the start location to the end location, the route comprising a plurality of route segments;

determine the route proportion for each of the plurality of route segments, the route proportion corresponding to a ratio of a length of the route segment to the length of the route; and generating the progress style, wherein the progress style specifies the minimum proportion for the plurality of route segments.

10. The method of claim 8, wherein the progress style specifies a maximum proportion for the plurality of route segments, wherein a given one of the route segments has a route proportion that exceeds the maximum proportion, and wherein the progress bar segment corresponding to the given route segment is rendered with a maximum display size based on the route proportion of the given route segment exceeding the maximum proportion such that the ratio of a length of the progress bar segment corresponding to the given route segment to a length of the progress bar is less than the ratio of a length of the given route segment to the length of the route.

11. The method of claim 8, wherein the progress bar comprise a horizontal progress bar, and wherein the segment progress to scale is displayed as a portion of the horizontal progress bar based on the route proportion of the current route segment.

12. The method of claim 6, further comprising:

receiving a corresponding segment type for each of the plurality of route segments; and displaying each of the plurality of route segments based on the corresponding segment type.

13. The computer readable medium of claim 3, wherein the route proportion of a route segment is a ratio of segment distance for the route segment to distance of the route or a ratio of an estimated segment travel time for the route segment to an estimated travel time of the route.

14. The system of claim 9, wherein the route proportion of a route segment is a ratio of segment distance for the route segment to distance of the route or a ratio of an estimated segment travel time for the route segment to an estimated travel time of the route.

15. The computer readable medium of claim 3, wherein the progress style specifies a maximum proportion for the plurality of route segments, wherein a given one of the route segments has a route proportion that exceeds the maximum proportion, and wherein the progress bar segment corresponding to the given route segment is rendered with a maximum display size based on the route proportion of the given route segment exceeding the maximum proportion such that the ratio of a length of the progress bar segment corresponding to the given route segment to a length of the progress bar is less than the ratio of a length of the given route segment to the length of the route.

16. The system of claim 9, wherein the progress style specifies a maximum proportion for the plurality of route segments, wherein a given one of the route segments has a route proportion that exceeds the maximum proportion, and wherein the progress bar segment corresponding to the given route segment is rendered with a maximum display size based on the route proportion of the given route segment exceeding the maximum proportion such that the ratio of a length of the progress bar segment corresponding to the given route segment to a length of the progress bar is less than the ratio of a length of the given route segment to the length of the route.

17. The system of claim 9, the mapping module being further executed by the one or more processors to:

determine a corresponding segment type for each of the plurality of route segments, wherein each of the plurality of route segments is displayed based on the corresponding segment type.

18. The system of claim 9, the user device interface being further executed by the one or more processors to:

send the route request to the user device interface;

receive the route and the progress style from the user device interface; and display an overall progress bar for the route based on the progress style and the route proportion of each of the plurality of route segments.

19. The computer readable medium of claim 3, the computer-executable program when executed further causing the computer processor to:

determine a corresponding segment type for each of the plurality of route segments, wherein each of the plurality of route segments is displayed based on the corresponding segment type.

* * * * *